(12) United States Patent
Leppänen et al.

(10) Patent No.: US 10,444,852 B2
(45) Date of Patent: Oct. 15, 2019

(54) METHOD AND APPARATUS FOR MONITORING IN A MONITORING SPACE

(71) Applicant: NOKIA TECHNOLOGIES OY, Espoo (FI)

(72) Inventors: Jussi Leppänen, Tampere (FI); Arto Lehtiniemi, Lempäälä (FI); Antti Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/742,577

(22) PCT Filed: Jul. 5, 2016

(86) PCT No.: PCT/FI2016/050499
§ 371 (c)(1),
(2) Date: Jan. 8, 2018

(87) PCT Pub. No.: WO2017/005983
PCT Pub. Date: Jan. 12, 2017

(65) Prior Publication Data
US 2018/0203515 A1  Jul. 19, 2018

(30) Foreign Application Priority Data

Jul. 8, 2015 (EP) .................................... 15175964

(51) Int. Cl.
*G06F 3/01* (2006.01)
*G06K 9/00* (2006.01)
(Continued)

(52) U.S. Cl.
CPC .............. *G06F 3/017* (2013.01); *G06F 3/011* (2013.01); *G06F 3/0485* (2013.01); *G06F 3/167* (2013.01);
(Continued)

(58) Field of Classification Search
CPC ........ G06F 3/017; G06F 3/011; G06F 3/0485; G06F 3/167; G06K 9/00355; G06K 9/00771; G06K 9/2054
See application file for complete search history.

(56) References Cited

U.S. PATENT DOCUMENTS

2013/0024819 A1  1/2013  Rieffel et al.
2014/0168062 A1  6/2014  Katz et al.
(Continued)

FOREIGN PATENT DOCUMENTS

EP        2 474 950 A1    7/2012
WO   WO 2013/095679 A1  6/2013

OTHER PUBLICATIONS

Oct. 8, 2018 Office Action issued in European Patent Application No. 15175964.4.

(Continued)

*Primary Examiner* — Peter D McLoone
(74) *Attorney, Agent, or Firm* — Squire Patton Boggs (US) LLP (57) ABSTRACT

A method comprising: causing computer implementation of the at least one virtual boundary in a monitoring space corresponding to a monitored scene space; processing sensor data to recognize a first hand gesture, relating to a first hand of a user in the monitored scene space, relative to the at least one computer-implemented virtual boundary in the monitoring space and in response to recognizing the first hand gesture relative to the at least one computer-implemented virtual boundary causing browsing of a plurality of options and processing sensor data to recognize a second hand gesture, relating to a second hand of the user in the monitored scene space, relative to the at least one virtual boundary in the monitoring space and in response to recognizing (Continued)

the second hand gesture in the monitored scene space selecting one of the plurality of options.

17 Claims, 5 Drawing Sheets

(51) Int. Cl.
  *G06K 9/20* (2006.01)
  *G06F 3/16* (2006.01)
  *G06F 3/0485* (2013.01)

(52) U.S. Cl.
  CPC ..... *G06K 9/00355* (2013.01); *G06K 9/00771* (2013.01); *G06K 9/2054* (2013.01)

(56) References Cited

U.S. PATENT DOCUMENTS

| | | |
|---|---|---|
| 2014/0282224 A1 | 9/2014 | Pedley |
| 2015/0040040 A1 | 2/2015 | Balan et al. |
| 2015/0185851 A1 | 7/2015 | Kauffmann et al. |
| 2015/0188776 A1 | 7/2015 | Lee et al. |
| 2015/0193197 A1* | 7/2015 | Nahman ............. G06F 3/04842 715/716 |

OTHER PUBLICATIONS

International Search Report & Written Opinion dated Sep. 29, 2016 corresponding to International Patent Application No. PCT/FI2016/050499.

Feb. 28, 2017 Examination Report corresponding to Vietnamese Patent Application 1-2018-00417 and English translation thereof.

European Office Action corresponding to Appln. No. 15 175 964.4, dated Jul. 5, 2019.

* cited by examiner

METHOD AND APPARATUS FOR MONITORING IN A MONITORING SPACE

TECHNOLOGICAL FIELD

Embodiments of the present invention relate to monitoring a scene. In particular, they relate to automated monitoring of a scene.

BACKGROUND

Current monitoring systems, such as surveillance systems, may comprise one or more cameras for video recording, with or without audio recording, connected via wires or wirelessly to a hub that stores or enables storage of the data recorded from the scene. An operator may, in some examples, be able to use the hub to program settings for the cameras and/or the hub.

BRIEF SUMMARY

According to various, but not necessarily all, examples of the disclosure there is provided a method as claimed in any of claims 1-13.

According to various, but not necessarily all, examples of the disclosure there is provided an apparatus as claimed in claim 14.

According to various, but not necessarily all, examples of the disclosure there is provided an apparatus comprising: at least one processor; and at least one memory including computer program code the at least one memory and the computer program code configured to, with the at least one processor, cause the apparatus at least to perform a method as claimed in any of claims 1-13.

According to various, but not necessarily all, examples of the disclosure there is provided computer program code that, when performed by at least one processor, causes a method of at least one of claims 1-13 to be performed.

According to various, but not necessarily all, examples of the disclosure there is provided a computer program that, when run on a computer, performs: a method as claimed in any of claims 1-13.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

The system 100 described is a system that monitors at least one scene. The operation of the system can be controlled by a user within the scene by carrying out actions within the scene. For example, the user is able to control the system so that the user can perform commands relating to at least one virtual boundary monitored by the system.

Figure 1:
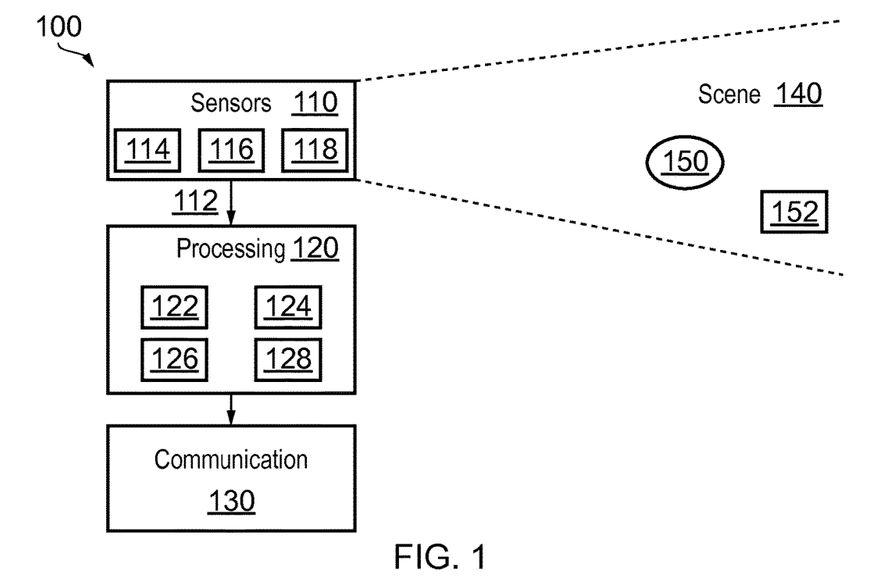
FIG. 1 schematically illustrates an example of a system.

FIG. 1 schematically illustrates a system 100 comprising: one or more sensors 110 configured to record sensor data 112 from a scene 140; a processing module 120 configured to process the sensor data 112 recorded from the scene 140 to recognise automatically events that occur in the scene 140 and to automatically take decisions as a consequence of the recognition; and a communication module 130 configured to communicate, when a decision to communicate is taken by the processing module 120.

Some but not necessarily all of the events that are recognised may relate to an object 152 or a particular object 152 in the scene 140. An object may be an inanimate object, an animal, a person or a particular person 150 in the scene 140. In some but not necessarily all examples of the system 100, the system 100 is a real-time recognition system and the automatic recognition and decision, if any, occur substantially at the same time as the sensor data 112 is recorded.

The system 100 may be used for surveillance, monitoring, assisted living, elderly care or other applications. The system 100 may be used in businesses, public areas or at home. One expected use is as a home surveillance system.

The system 100 may enable a user to control monitoring, for example, when the user is a person 150 in the scene 140. The system 100 may enable a user to control recognition and/or a consequence of recognition, for example, when the user is a person 150 in the scene 140.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording, Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, the sensors 110 are fixed in space relative to the scene space 140. In other examples, the sensors 110 are movable or moving relative to the scene space 140.

In some, but not necessarily all embodiments, the sensors 110 are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is viewed from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement such as a microphone array so that the scene 140 is sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the scene 140 with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing the person 150 or object 152 to be sensed are passive and merely reflect incident light or sound waves emitted by a transmitter. However, 'active' examples, which require activity at the sensed object, may additionally or alternatively be used. As an example, a person 150 may carry a positioning apparatus that is configured to position the positioning apparatus within the scene space 140. The positioning apparatus may for example measure motion of the positioning apparatus from a reference position using accelerometers. Gyroscopes may optionally be used to determine orientation. Additionally or alternatively, the positioning apparatus may enable positioning via triangulation (trilateration) by transmitting to multiple receivers and/or receiving from multiple transmitters.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the control sub-module 128 may be performed by the same circuitry or under the control of the same computer program. Alternatively one or more of the processing sub-module 124, the recognition sub-module 126, and the control sub-module 128 may be performed by dedicated circuitry or a dedicated computer program. The sub-modules may be performed using software, dedicated hardware or a mix of programmed hardware and software.

The memory sub-module 122 may be used to store unprocessed sensor data 111 and/or processed sensor data 112 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114. The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:
  use machine (computer) vision to perform one or more of:
    detect a (moving or stationary) object or person,
    classify a (moving or stationary) object or person, and/or
    track a (moving or stationary) object or person;
  use spatial analysis to perform one or more of:
    position a (moving or stationary) object in the scene space using depth determination; and/or
    create a map of the scene space; and/or
  use behaviour analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behaviour.

Object tracking may be achieved by labelling objects and recording the position in the scene 140 of the labelled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object.

This can be used to detect small scale human motion such as gestures, hand movement, facial movement. These are scene independent user (only) movements relative to the user.

The system may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behaviour analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognise a putative symbol encoding an event in the scene 140 as a meaningful symbol associated with a particular meaning.

The recognition sub-module 126 may be configured to recognize a putative symbol, defined in terms of parameters determined from the machine (computer) vision analysis and/or the spatial analysis, and produced by the processing sub-module 124 as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised learning, to recognise meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 126 performs a response action.

In some but not necessarily all examples the action performed may be programmed by a user. In some but not necessarily all examples the programming may occur via motion of the user within the scene. Examples of actions performed may be the generation of an alert or notification.

The alert or notification may be provided via the communications module 130. The communications module 130 may communicate wirelessly, via radio waves or via a wired connection to a local or remote apparatus. Examples of such apparatus include but are not limited to displays, televisions, audio output apparatus, personal devices such as mobile telephone or personal computers, a projector or other user output apparatus.

In some but not necessarily all examples the response symbol may be programmed by a user. For example, a user may be able to program or teach a meaningful event that is represented by a meaningful response symbol. The response symbol, created by the user, may be added to the database of reference symbols or otherwise used to recognise a putative symbol as a meaningful symbol. In some but not necessarily all examples the programming may occur via motion of the user within the scene 140. Examples of meaningful events that are represented by meaningful symbols include particular actions or movements performed such as user input gestures.

b) If the putative symbol is similar to a user control symbol, the meaningful event is a 'user control' event, and the control sub-module 126 enables user control of monitoring and/or user control of the response.

For example, a user may be able to program or teach a meaningful response symbol that is added to the database of reference symbols. In some but not necessarily all examples the programming may occur via motion of the user within the scene 140.

For example, a user may be able to program or teach an action performed when the putative symbol is matched to a response symbol. Examples of actions performed may be the generation of an alert or notification.

Figure 2:
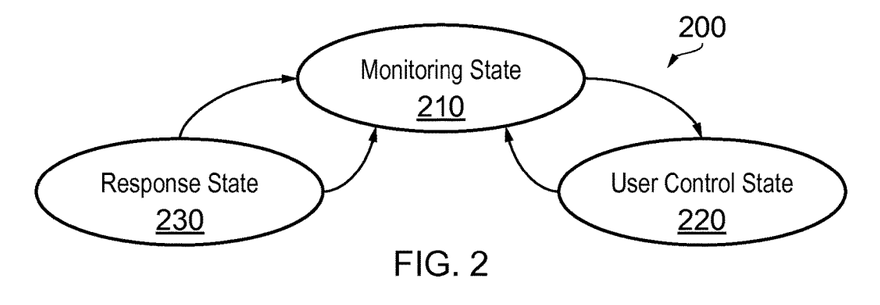
FIG. 2 illustrates an example of a state machine.

The operation of the processing module 120 may be further understood from FIG. 2 which illustrates a state machine 200 for the processing module 120. The state machine 200 has a monitoring state 210, a user control state 220 and an automatic response state 230.

In the monitoring state 210, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition.

However, 'predetermined' in this document should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 126 responds automatically depending on the event. If the meaningful event is a 'response' event, then the state machine 200 transitions to the response state 230 and the control sub-module 126 performs a response action. The response action may be associated with the response event. If the event is a 'user control' event, then the state machine 200 transitions to the user control state 220 and user control of monitoring and/or response is enabled. The enablement may be in a manner associated with that user control state 220.

A particular gesture user input may be used as a 'user control' event. A gesture user input is a gesture that has meaning to the system 100 as a user input. A gesture may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors 110. The body part may comprise the user's hand or part of the user's hand such as one or more fingers and thumbs. In other examples, the user input object may comprise a different part of the body of the user such as their head or arm. Three-dimensional movement may comprise motion of the user input object in any three orthogonal directions. The motion may comprise the user input object moving towards or away from the sensors 110 as well as moving in a plane parallel to the sensors or any combination of such motion. A gesture may be a non-contact gesture. A non-contact gesture does not contact the apparatus sensors at any time during the gesture. A gesture may be an absolute gesture that is defined in terms of an absolute displacement from the sensors 110. Such a gesture may be tethered, in that it is performed at a precise location in the scene space. Alternatively a gesture may be a relative gesture that is defined in terms of relative displacement during the gesture. Such a gesture may be un-tethered, in that it need not be performed at a precise location relative in the scene space and may be performed at a large number of arbitrary locations. A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$. A gesture may be performed in one spatial dimension (1D gesture), two spatial dimensions (2D gesture) or three spatial dimensions (3D gesture).

In some examples, the system 100 may track one or more objects and/or points in relation to a person's body in gesture recognition. For example, the system 100 may perform full skeletal tracking of a person's body in gesture recognition.

Implementation of the processor module 120 or part of the processor module 120 may be as controller circuitry. The controller circuitry 120 may be implemented in hardware alone, have certain aspects in software including firmware alone or can be a combination of hardware and software (including firmware).

Figure 3:
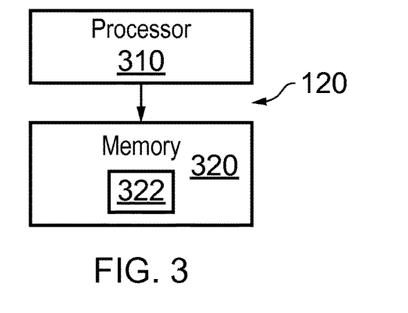
FIG. 3 illustrates an example of a processing module.

As illustrated in FIG. 3 the controller 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed. The processor 310 by reading the memory 320 is able to load and execute the computer program 322.

The system 100 may therefore comprise an apparatus 120 that comprises:

at least one processor 310; and at least one memory 320 including computer program code 322 the at least one memory 320 and the computer program code 322 configured to, with the at least one processor 310, cause the apparatus 120 at least to perform one or more of blocks 124, 126, 128 of FIG. 1 and/or one or more of the blocks of FIG. 12.

Figure 4:
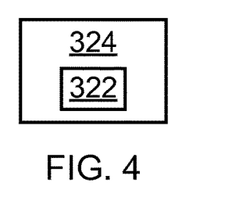
FIG. 4 illustrates an example of a delivery mechanism for a computer program.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322. The apparatus 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks 124, 126, 128 illustrated in the FIG. 1 and/or the blocks illustrated in FIG. 12 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

Figure 5:
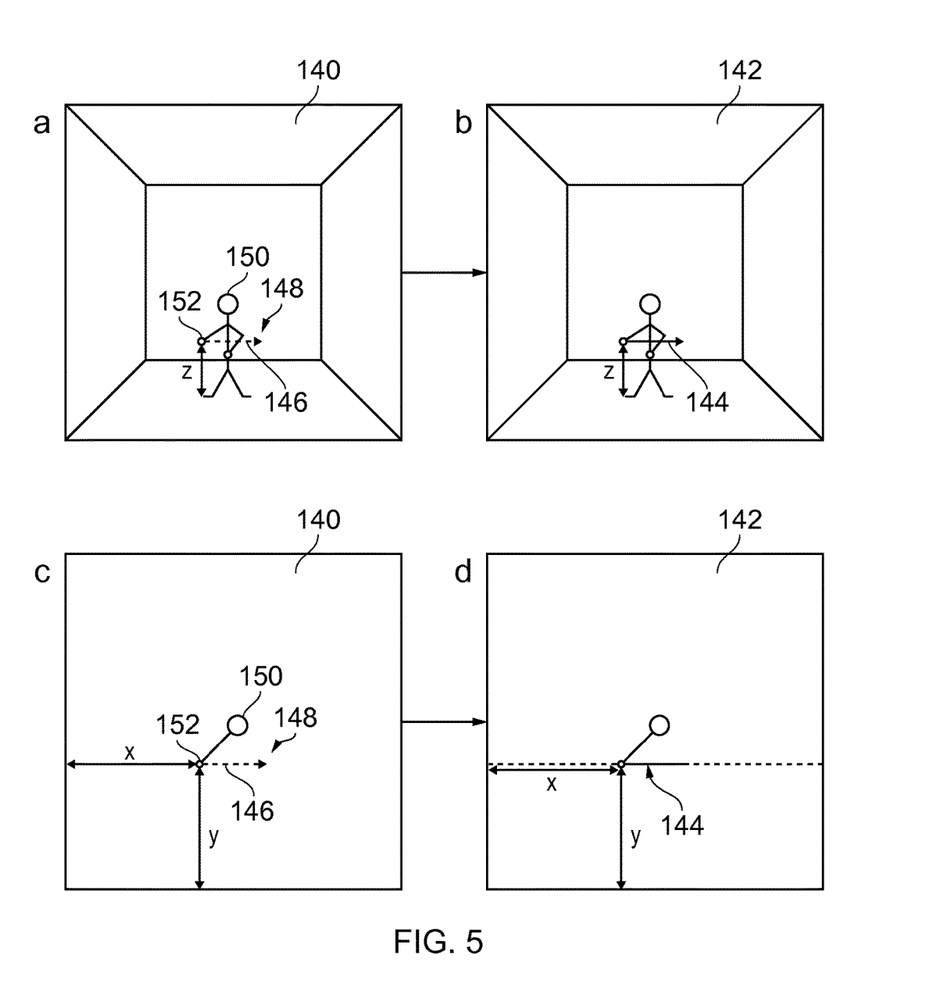
FIG. 5 illustrates an example of operation of the system.

FIG. 5 illustrates an example of operation of the system 100. Part a in the example of FIG. 5 illustrates a scene 140. The scene 140 is a real-world scene. The scene 140 comprises a three-dimensional space and may therefore be considered a scene space 140. The scene space 140 is monitored by the system 100. The scene space may therefore be considered a monitored scene space 140. In the example of FIG. 5 the monitored scene space 140 is a room comprising four walls, a ceiling and a floor.

In some examples the monitored scene space 140 may comprise no boundaries. Additionally or alternatively in examples the monitored scene space 140 may comprise a plurality of rooms that may or may not be spatially connected.

In the example of FIG. 5 a person 150, a user, is standing in the monitored scene space 140. The person 150 is performing at least one gesture user input 146 to define at least one computer-implemented virtual boundary 144. The gesture user input 146 may be referred to as a gesture 146 and may be as described above with reference to FIG. 2. The gesture 146 may be considered a boundary indication gesture 146.

Gesture-Defined Boundary

In the illustrated example the person 150 is performing a gesture 146 to define a single computer-implemented virtual boundary 144.

The gesture 146 comprises movement of one or more user input objects, which may be body parts. In the example of FIG. 5 the gesture 146 comprises the person 150 moving 148 one or more user input object 152.

In examples, the movement 148 may comprise any motion in one spatial dimension, two spatial dimensions or three spatial dimensions and may take any form.

Part c of the example of FIG. 5 illustrates an overhead view of the monitored scene space 140 in which the person 150 is illustrated making the gesture 146 to define a computer-implemented virtual boundary 144.

As can be seen in parts a and c of the example of FIG. 5, the gesture 146 has a position having Cartesian orthogonal coordinates $(x_i(t), y_i(t), z_i(t))$ in the scene 140 for each user input object i, at time t. In this example, $x_i(t)$ is measured from the left wall, $y_i(t)$ is measured from the front wall and $z_i(t)$ is measured from the floor. It will be understood that other coordinate systems may be used and that different orientations of the Cartesian coordinate system may be used For simplicity of illustration in FIG. 5, the gesture 146 comprises motion of one user input object 152 in one spatial dimension—as the value of x changes along the path 148 and the values of y and z remain constant. In other examples the values of x, y and/or z may vary in any way with movement 148 from any starting position in the monitored scene space 140. Also multiple user input objects may be used.

Parts b and d of the example of FIG. 5 illustrate a monitoring space 142. The monitoring space 142 comprises a virtual representation of the monitored scene space 140 created and used by the system 100. The monitoring space 142 may be formed, for example, from sensor data 112 provided by the sensors 110, such as received image data and/or audio data and/or depth data.

Parts b and d illustrate respectively the same views as illustrated in parts a and c of FIG. 5.

In some examples the system 100 may use information of the geometry of the monitored scene space 140 to form the monitoring space 142. For example, the system 100 may use a three dimensional model of the monitored scene space 140 in the formation of the monitoring space 142. The three dimensional model of the monitored scene space 140 may be created by the system 100 and/or may be received by the system 100. Methods for creating a three dimensional model of the monitored scene space 140 are known in the art.

The system 100 may use the monitoring space 142 to monitor the scene space 140. For example, the system may use the monitoring space 142 to implement and monitor at least one virtual boundary 144.

As indicated by the arrows between parts a and b and parts c and d of FIG. 5 there is a correspondence between the monitoring space 142 and the monitored scene space 140. In some examples there may be a one to one mapping between the monitoring space 142 and the monitored scene space 140.

In other examples there may be a scale invariant transformation between the monitored scene space 140 and the monitoring space 142.

The system 100 recognizes the gesture 146 performed by the person 150 and in response implements at least one virtual boundary 144 in the monitoring space 142. In some examples, recognizing the gesture 146 may comprise processing sensor data 112, such as image data and/or depth data. For example, the system 100 may analyze one or more video feeds.

In examples, a shape and position of the virtual boundary 144 in the monitoring space is determined, at least partially, the gesture 146 in the monitored scene space 140 and the virtual boundary 144 is located in the monitoring space at a corresponding location equivalent to the location of the path 148 in the monitored scene space 140.

The gesture 146 may be an absolute gesture or tethered gesture as described above in relation to FIG. 2.

Response Event

The system 100, may process sensor data 112 to generate a response event when there is, relative to the at least one virtual boundary 144, a change in a portion of the monitored scene space 140 that causes a change in a portion of the monitoring space 142 demarcated by the virtual boundary.

For example, the system 100 may process data 112 provided by the sensors 110, such as audio and/or image data, to generate the response event. The system may analyze one or more audio and/or video feeds to generate the response event. In some examples processing the sensor data 112 to generate the response event may be considered monitoring the virtual boundary 144.

In examples the same sensor, such as a camera, may be used in recognition of the gesture 146 defining the at least one virtual boundary 144 and for monitoring the at least one virtual boundary 144.

In some examples, processing sensor data 112 to generate the response event may comprise processing sensor data 112 to monitor the virtual boundary 144 to detect activity across the virtual boundary 144 and/or activity within a threshold of the virtual boundary 144. For example, the system 100 may process audio and/or image and/or depth data to monitor the virtual boundary 144 to detect activity across the virtual boundary 144 or within a threshold of the virtual boundary 144.

Boundary Interaction

From the foregoing it will be understood that the system 100 is configured to cause computer implementation of the at least one virtual boundary 144 in a monitoring space 142 corresponding to a monitored scene space 140 and to process sensor data 112 to generate a response event when there is, relative to the at least one computer-implemented virtual boundary 144, a change in a portion of the monitored scene space 140.

The system 100 is additionally configured to recognize a first hand gesture 149 relating to a first hand $152_1$ of a user 150 in the monitored scene space 140 and in response to recognizing the first hand gesture 149 in the monitored scene space 140 in relation to a portion of the computer-implemented virtual boundary 144 enable user location of a portion of the implemented computer-implemented virtual boundary 144.

The system 100 is additionally configured to recognize a second hand gesture 151 relating to a second hand $152_2$ of the user 150 in the monitored scene space 140 and in response to recognizing the second hand gesture 151 in the monitored scene space 140 perform a command relating to the user located portion of the computer-implemented virtual boundary 144.

Command Type

The command may be an information command that enables the user 150 to control the system 100 to provide to the user 150 information relating to the computer-implemented virtual boundary 144.

The command may be a boundary adaptation command that enables the user 150 to control the system 100 to adapt the computer-implemented virtual boundary 144. The adaptation of the computer-implemented virtual boundary 144 may comprise modifying one or more of: a shape of the computer-implemented virtual boundary 144, a position of the computer-implemented virtual boundary 144 and an orientation of the computer-implemented virtual boundary 144. The system 100 then processes sensor data 112 to generate a response event based on the modified computer-implemented virtual boundary 144. The response event is produced when there is, relative to the modified computer-implemented virtual boundary 144, a change in a portion of the monitored scene space 140.

The adaptation of the computer-implemented virtual boundary 144 may alternatively comprise deletion of the computer-implemented virtual boundary 144. The system 100 does not then processes sensor data 112 to generate a response event based on the computer-implemented virtual boundary 144.

In examples, such as those described below, the first hand $152_1$ may be used consistently for boundary location and for selection but not for effecting commands and the second hand $152_2$ may be used consistently for effecting commands but not for boundary location and selection.

In examples, such as those described below, the second hand gesture 151 is part of a two-handed gesture 148 in the monitored scene space 140. The two-handed gesture 148 comprises a first hand gesture 149 and the second hand gesture 151. In some but not necessarily all examples, the command, performed in response to recognizing the second hand gesture 151 in the monitored scene space 140, is dependent upon the two-handed gesture 148.

The process of recognizing a two-handed gesture 148 may comprise processing sensor data 112 (e.g. image data and/or depth data) to track motion of parts of the user's body in the monitored scene space 140. A two-handed gesture 148 may be a gesture that involves relative movement of both hands of one person relative to one or more of: a wrist joint and/or an elbow joint and/or a shoulder joint.

In some but not necessarily all examples, the command, performed in response to recognizing the second hand gesture 151 in the monitored scene space 140, is dependent upon a state of the first hand $152_1$, concurrent with the second hand gesture 151.

Hot-Spot

FIGS. 6A, 6B, 7A, 7B, 8A, 8B illustrate an example of how options associated with a 'hot-spot' 160 in a monitored scene space 140 defined by a corresponding computer-implemented virtual boundary 144 in a corresponding monitoring space 142 may be browsed and selected by user gestures 148, 149, 151 in the monitored scene space 140.

Figure 6A:
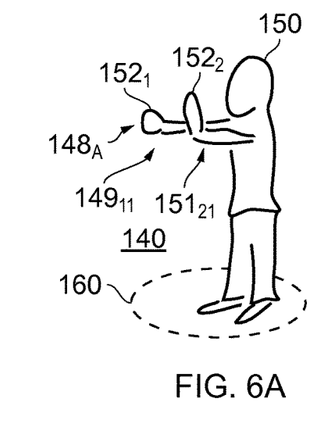
FIGS. 6A, 6B, 7A, 7B, 8A, 8B illustrate an example of how options associated with a 'hot-spot' in a monitored scene space defined by a corresponding computer-implemented virtual boundary in a corresponding monitoring space may be browsed and selected by user gestures in the monitored scene space.
Figure 6B:
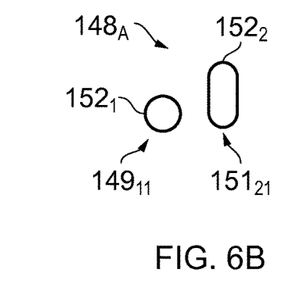
Figure 7A:
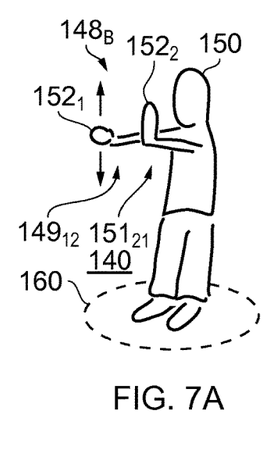
Figure 7B:
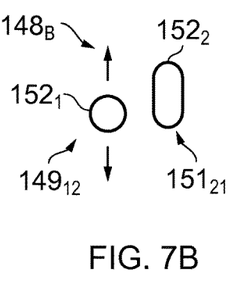
Figure 8A:
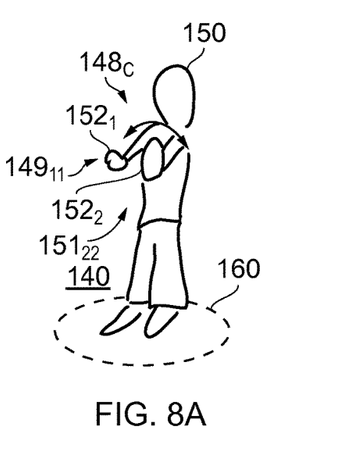
Figure 8B:
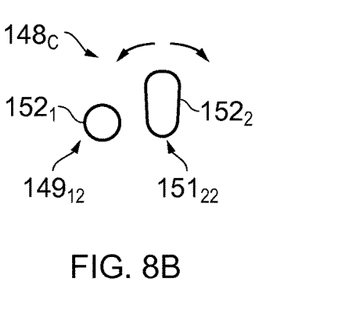

FIGS. 6A, 7A, 8A illustrate the 'hot-spot' 160 in a monitored scene space 140 and different user gestures 148, 149, 151 at the hot spot 160. FIGS. 6B, 7B, 8B illustrate the different user gestures 148, 149, 151 performed in respective FIGS. 6A, 7A, 8A.

Referring to FIGS. 6A, 6B, the system 100 processes sensor data 112 to recognize a transition hand gesture $148_A$ relative to the computer-implemented virtual boundary 144 in the monitoring space 142.

In response to recognizing the transition hand gesture $148_A$ relative to the computer-implemented virtual boundary 144 the system 100 enables a browsing mode in which browsing of a plurality of options and selection of an option is possible by a user.

Recognition of a transition hand gesture $148_A$ relative to the computer-implemented virtual boundary 144 in the monitoring space may comprise recognizing that the transition hand gesture $148_A$ is performed in the monitored scene space 140 at a location (hot spot 160) that corresponds with a location in the monitoring space 142 that is at, or inside or within a threshold distance of the computer-implemented virtual boundary 144 in the monitoring space 142.

The system 100 may be configured to process sensor data 112 to recognize the transition hand gesture as or as part of a transition two-handed gesture $148_A$. The transition two-handed gesture $148_A$ comprises a transition first hand gesture $149_A$ and a transition second hand gesture $151_{21}$.

The transition first hand gesture $149_{11}$ may be defined by two components—a description of a state or shape of the first hand $152_1$ and a description of the motion (or lack of motion) of the first hand $152_1$. In this example, but not necessarily all examples, the first hand $152_1$ is in a first state (a fist in this example) and is stationary. The sub-script label of the transition first hand gesture $149_{11}$ has a first sub-script indicating the state or shape of the first hand $152_1$ and a second sub-script indicating the motion of the first hand $152_1$.

The transition second hand gesture $151_{21}$ may be defined by two components—a description of a state or shape of the second hand $152_2$ and a description of the motion (or lack of motion) of the second hand $152_2$. In this example, but not necessarily all examples, the second hand $152_2$ is in a second state (palm open, fingers upwards) and is stationary. The sub-script label of the transition second hand gesture $151_{21}$ has a first sub-script indicating the state or shape of the second hand $152_2$ and a second sub-script indicating the motion of the second hand $152_2$.

The system 100 may be configured to provide feedback to the user in response to recognizing the transition hand gesture $148_A$ relative to the computer-implemented virtual boundary 144.

Referring to FIGS. 7A, 7B, after entering the browsing mode, the system 100 processes sensor data 112 to recognize a first hand gesture $149_{12}$, relating to a first hand $152_1$ of a user 150 in the monitored scene space 140, relative to the computer-implemented virtual boundary 144 in the monitoring space 142.

In response to recognizing the first hand gesture $149_{12}$, relating to a first hand $152_1$ of a user 150 in the monitored scene space 140, relative to the computer-implemented virtual boundary 144 the system 100 causes browsing of the plurality of options.

Recognition of the first hand gesture $149_{12}$ relating to the first hand $152_1$ of the user 150 in the monitored scene space 140, relative to the computer-implemented virtual boundary 144 in the monitoring space 142 may comprise recognizing that the first hand gesture $149_{12}$ is performed in the monitored scene space 140 by the first hand $152_1$ of a user 150 (or a particular user 150) and recognizing that the first hand gesture $149_{12}$ is performed at a location (hot spot 160) that corresponds with a location in the monitoring space 142 that is at, or inside or within a threshold distance of the computer-implemented virtual boundary 144 in the monitoring space 142.

The system 100 may be configured to processes sensor data 112 to recognize the first hand gesture as or as part of a first two-handed gesture $148_B$ The first two-handed gesture $148_B$ comprises a first hand gesture $149_{12}$ and a second hand gesture $151_{21}$.

The first hand gesture $149_{12}$ may be defined by two components—a description of a state or shape of the first hand $152_1$ and a description of the motion (or lack of motion) of the first hand $152_1$. In this example, but not necessarily all examples, the first hand $152_1$ is in a first state (a fist in this example) and is moving. The sub-script label of the first hand gesture $149_{12}$ has a first sub-script indicating the state or shape of the first hand $152_1$ and a second sub-script indicating the motion of the first hand $152_1$.

The second hand gesture $151_{21}$ may be defined by two components—a description of a state or shape of the second hand $152_2$ and a description of the motion (or lack of motion) of the second hand $152_2$. In this example, but not necessarily all examples, the second hand $152_2$ is in a second state (palm open, fingers upwards) and is stationary. The sub-script label of the second hand gesture $151_{21}$ has a first sub-script indicating the state or shape of the second hand $152_2$ and a second sub-script indicating the motion of the second hand $152_2$.

The first two-handed gesture $148_B$ is similar to the transition two-handed gesture $148_A$ in that the second hand gesture $151_{21}$ is the same in both state and motion. The first two-handed gesture $148_B$ is different to the transition two-handed gesture $148_A$ in that the first hand gesture $149_{12}$ has the same state but has different motion.

In this example but not necessarily all examples, the motion of the first hand $152_1$ in the first hand gesture $149_{12}$ is a linear motion.

The system 100 may be configured to provide feedback to the user in response to recognizing the first hand gesture $149_{12}$, relating to a first hand $152_1$ of a user 150 in the monitored scene space 140, relative to the computer-implemented virtual boundary 144 in the monitoring space 142.

Referring to FIGS. 8A, 8B, next after user browsing of the plurality of options, the system 100 processes sensor data 112 to recognize a second hand gesture $151_{22}$, relating to a second hand $152_2$ of the user 150 in the monitored scene space 140, relative to the virtual boundary 144 in the monitoring space 142

In response to recognizing the second hand gesture $151_{22}$ relating to the second hand $152_2$ of the user 150 in the monitored scene space 140, relative to the computer-implemented virtual boundary 144, the system 100 selects one of the plurality of options.

Recognition of the second hand gesture $151_{22}$ relating to the second hand $152_2$ of the user 150 in the monitored scene space 140, relative to the computer-implemented virtual boundary 144 in the monitoring space 142 may comprise recognizing that the second hand gesture $151_{22}$ is performed in the monitored scene space 140 by the second hand $152_2$ of a user 150 (or a particular user 150) and recognizing that the second hand gesture $151_{22}$ is performed at a location (hot spot 160) that corresponds with a location in the monitoring space 142 that is at, or inside or within a threshold distance of the computer-implemented virtual boundary 144 in the monitoring space 142.

The system 100 may be configured to processes sensor data 112 to recognize the second hand gesture $151_{22}$ as or as part of a second two-handed gesture $148_C$. The second two-handed gesture $148_C$ comprises a first hand gesture $149_{11}$ and a second hand gesture $151_{22}$.

The first hand gesture $149_{11}$ may be defined by two components—a description of a state or shape of the first hand $152_1$ and a description of the motion (or lack of motion) of the first hand $152_1$. In this example, but not necessarily all examples, the first hand $152_1$ is in a first state (a fist in this example) and is stationary. The sub-script label of the first hand gesture $149_{11}$ has a first sub-script indicating the state or shape of the first hand $152_1$ and a second sub-script indicating the motion of the first hand $152_1$.

The second hand gesture $151_{22}$ may be defined by two components—a description of a state or shape of the second hand $152_2$ and a description of the motion (or lack of motion) of the second hand $152_2$. In this example, but not necessarily all examples, the second hand $152_2$ is in a second state (palm open, fingers upwards) and is moving. The sub-script label of the second hand gesture $151_{22}$ has a first sub-script indicating the state or shape of the second hand $152_2$ and a second sub-script indicating the motion of the second hand $152_2$.

The second two-handed gesture $148_C$ is similar to the first two-handed gesture $148_B$ in that the states but not the motions of the first hand gesture $149_{11}$ and the second hand gesture $151_{21}$ is the same. The second two-handed gesture $148_C$ is different to the first two-handed gesture $148_B$ in that the first hand gesture $149_{11}$ has the same state but has different motion. The second two-handed gesture $148_C$ is different to the first two-handed gesture $148_B$ in that the second hand gesture $151_{22}$ has the same state but has different motion.

The second two-handed gesture $148_C$ is similar to the transition two-handed gesture $148_A$ in that the first hand gesture $149_{11}$ is the same in both state and motion. The second two-handed gesture $148_C$ is different to the transition two-handed gesture $148_A$ in that the second hand gesture $151_{22}$ has the same state but has different motion.

In this example but not necessarily all examples, the motion of the second hand $152_2$ in the second hand gesture $151_{22}$ is a rotation.

The system 100 may be configured to provide feedback to the user in response to recognizing the second hand gesture $151_{22}$, relating to a second hand $152_2$ of the user 150 in the monitored scene space 140, relative to the virtual boundary 144 in the monitoring space 142.

It will be understood that although particular gestures are illustrated in FIGS. 6A, 6B, 7A, 7B, 8A, 8B other gestures may be used. The invention is not intended to be limited to the gestures, states or motions illustrated. The gestures, states and motions illustrated are but one way of implementing the invention.

The plurality of options may comprises command options enabling a user to actuate user commands for example as described below.

Figure 9A:
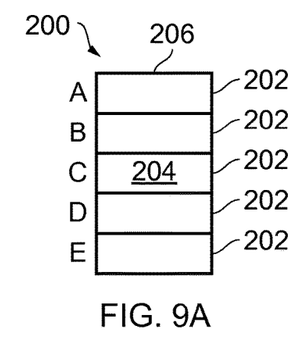
FIGS. 9A, 9B and 9C illustrate an example of a plurality of options in the form of a list.
Figure 9B:
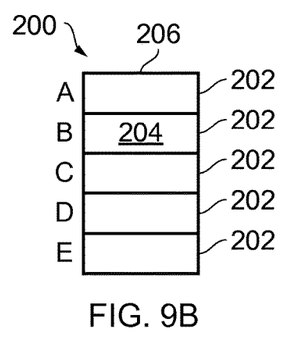
Figure 9C:
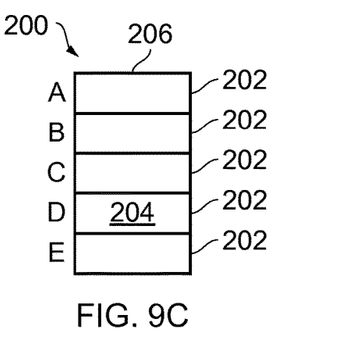

For example, as illustrated in FIGS. 9A, 9B and 9C a plurality of options 200 may take the form of a list 206 of options 202.

The first hand gesture $149_{12}$ (FIG. 7A, 7B) changes a current option 204 from one option 202 in the list 206 to another different option 202 in the list 206. The second hand gesture $151_{22}$ (FIG. 8A, 8B) selects the current option 204 and provides a command in relation the current option 204.

In FIG. 9A, the current option 204 is the option C. Performing the first hand gesture $149_{12}$ in a first direction, for example upwards, scrolls up the list 206 changing the current option 204. In FIG. 9B, the current option 204 has scrolled up the list 206 and the current option 204 is the option B that precedes the option C in the list 206. Performing the first hand gesture $149_{12}$ again in the first direction would scroll up the list 206 again changing the current option 204 to option A that precedes the option B in the list 206.

In FIG. 9A, the current option 204 is the option C. Performing the first hand gesture $149_{12}$ in a second direction, opposite the first direction, scrolls down the list 206 changing the current option 204. The second direction may for example be downwards. In FIG. 9C, the current option 204 has scrolled down the list 206 and the current option 204 is the option D that follows the option C in the list 206. Performing the first hand gesture $149_{12}$ again in the second direction would scroll down the list 206 again changing the current option 204 to option E that follows the option D in the list 206.

In will therefore be understood that by performing the first hand gestures $149_{12}$ in the first and/or second directions the plurality of options 200 is browsed and any option 202 in the list 206 of options 202 can be controlled by the user to be the current option 204.

Each time the current option 204 changes, feedback may be provided to the user 150 for example indicating a consequence of selection of the current option 204.

The second hand gesture $151_{22}$ (FIGS. 8A, 8B) selects the current option 204 and provides a command in relation to the current option 204.

Figure 10:
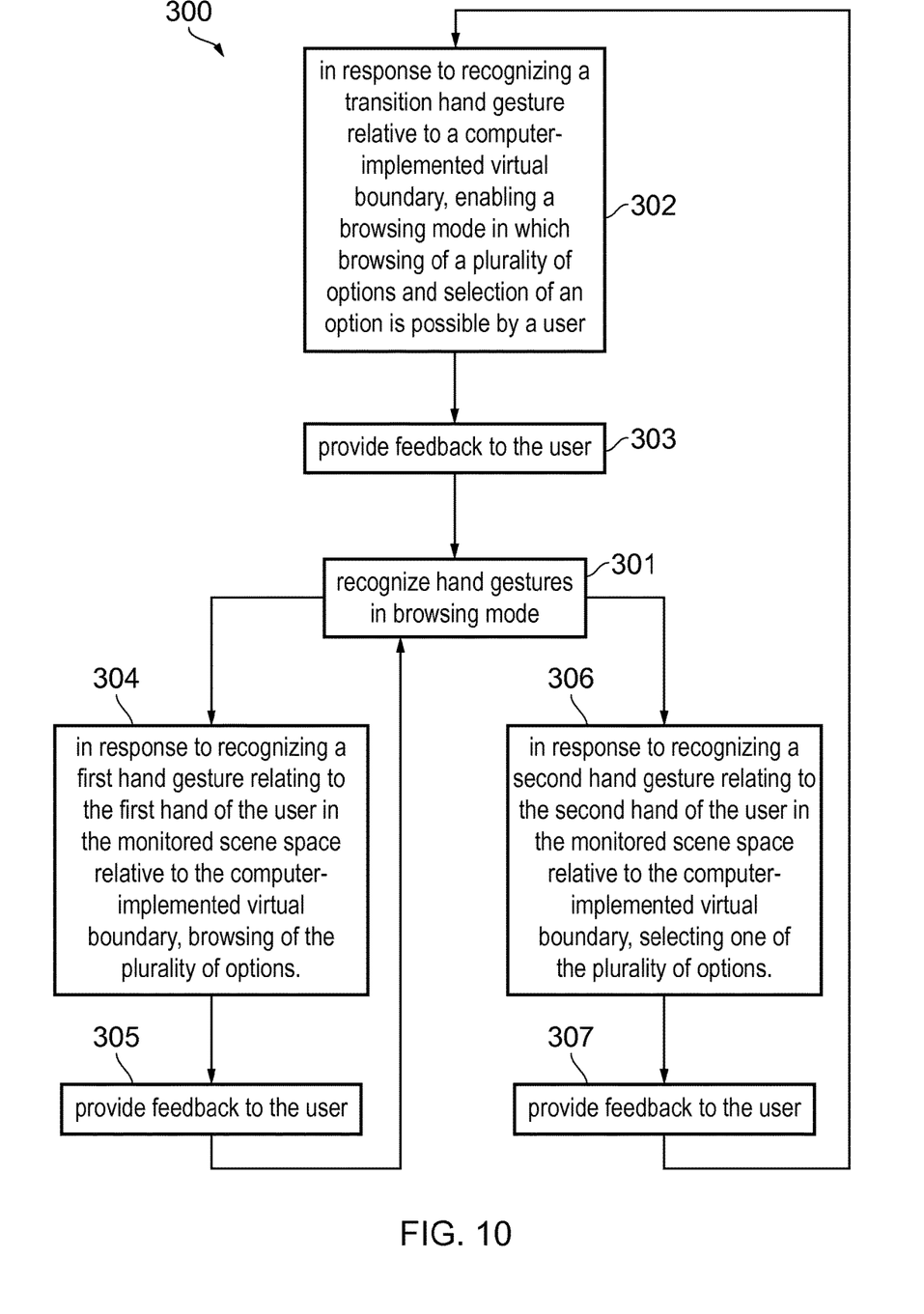
FIG. 10 illustrates a method by which options associated with a 'hot-spot' are browsed and selected by user gestures in the monitored scene space.

FIG. 10 illustrates a method 300. In this method 300, options associated with a 'hot-spot' 160 in a monitored scene space 140 defined by a corresponding computer-implemented virtual boundary 144 in a corresponding monitoring space 142 are browsed and selected by user gestures in the monitored scene space 140.

At block 302, the system 100 processes sensor data 112 to recognize a transition hand gesture $148_A$ relative to the computer-implemented virtual boundary 144 in the monitoring space 142. In response to recognizing the transition hand gesture $148_A$ relative to the computer-implemented virtual boundary 144 the system 100 enables a browsing mode in which browsing of a plurality of options and selection of an option is possible by a user.

At optional block 303, the system 100 may be configured to provide feedback to the user in response to recognizing the transition hand gesture $148_A$ relative to the computer-implemented virtual boundary 144.

Next at block 301 the system 100 processes sensor data 112 to recognize hand gestures in the browsing mode. The system 100 processes sensor data 112 to recognize a first hand gesture $149_{12}$, relating to a moving first hand $152_1$ of a user 150 in the monitored scene space 140, relative to the computer-implemented virtual boundary 144 in the monitoring space 142. The system 100 processes sensor data 112 to recognize a moving second hand gesture $151_{22}$, relating to a second hand $152_2$ of the user 150 in the monitored scene space 140, relative to the virtual boundary 144 in the monitoring space 142

At block 304, in response to recognizing the moving first hand gesture $149_{12}$, relating to a first hand $152_1$ of a user 150 in the monitored scene space 140, relative to the computer-implemented virtual boundary 144 the system 100 causes browsing of the plurality of options.

At optional block 305, the system 100 may be configured to provide feedback to the user in response to recognizing the moving first hand gesture $149_{12}$, relating to a first hand $152_1$ of a user 150 in the monitored scene space 140, relative to the computer-implemented virtual boundary 144 in the monitoring space 142.

The loop from block 301, via block 304 and back to block 301 enables browsing of the plurality of options.

At block 306, in response to recognizing the second hand gesture $151_{22}$ relating to the second hand $152_2$ of the user 150 in the monitored scene space 140, relative to the computer-implemented virtual boundary 144, the system 100 selects one of the plurality of options.

At optional block 307, the system 100 may be configured to provide feedback to the user in response to recognizing the second hand gesture $151_{22}$, relating to a second hand $152_2$ of the user 150 in the monitored scene space 140, relative to the virtual boundary 144 in the monitoring space 142

The method then returns to block 302.

Referring to FIG. 10, it will be understood that in some examples the blocks 304, 306 are only accessible via the block 302. Thus browsing of the plurality of options is enabled only when the transition hand gesture is relative to the computer-implemented virtual boundary (e.g. at or near the hot spot 160). Browsing of the plurality of options is not enabled when the transition hand gesture is not relative to the computer-implemented virtual boundary (e.g. at or near the hot spot 160).

Options

The plurality of options may be options for controlling one or more appliances. For example, as illustrated in FIGS.

9A, 9B and 9C the plurality of options 200 may take the form of a list 206 of options 202 for appliances.

Examples of appliances include but are not limited to a dish washer, a stove, a heater, a sauna. The system 100 allows a user 150 to remotely control one or more appliances by performing predetermined gestures $148_A$, $148_B$, $148_C$, relative to the virtual boundary 144.

At block 304, in response to recognizing the moving first hand gesture $149_{12}$, relating to a first hand $152_1$ of a user 150 in the monitored scene space 140, relative to the computer-implemented virtual boundary 144 the system 100 causes browsing of the plurality of options 200. For example, any option 202 in a list 206 of options 202 can be controlled by the user to be the current option 204.

At block 305, the system 100 is configured to provide feedback to the user each time the current option 204 changes. Feedback may be provided to the user 150 indicating a consequence of selection of the current option 204.

For example, where the list 206 of options 202 is a list of appliances each new current option 204 is associated with a different appliance. When the current option 204 changes, the name of the appliance will be provided to the user via synthetic speech as audio output.

In some but not necessarily all examples, after the name of the appliance has been provided to the user via synthetic speech as audio output, the status of the appliance will be provided automatically via synthetic speech as audio output. The status may indicate, for example, whether the appliance is on or off, timing information and other setting information depending upon the appliance.

In some but not necessarily all examples, the list 206 of options 202 is an ordered list. For example, the list of options may be ordered in most popular first, alphabetically, location or based on ease of programming an option. The ordering of the list 206 may therefore be dynamic and change over time.

At block 306, in response to recognizing the moving second hand gesture $151_{22}$ relating to the second hand $152_2$ of the user 150 in the monitored scene space 140, relative to the computer-implemented virtual boundary 144, the system 100 selects the current option 204.

The selection of the current option 204 may, for example, comprise in relation to the appliance associated with the current option, switching the appliance on, switching the appliance off, setting timing information or other setting information depending upon the appliance.

At block 307, the system 100 is configured to provide feedback to the user in response to selecting the current option.

For example a new status of the appliance may be provided to the user via synthetic speech as audio output. The status may indicate, for example, whether the appliance is on or off, timing information and other setting information depending upon the appliance.

In this example, the list 206 of options 202 relates to multiple appliances and provides a list of appliances as options 202. Selection of a current option 204 enables programming of that appliance.

In another example, the list 206 of options 202 may relate to one appliance and provide a list of functions as options 202. Selection of a current option 204 enables programming of that function.

Figure 11:
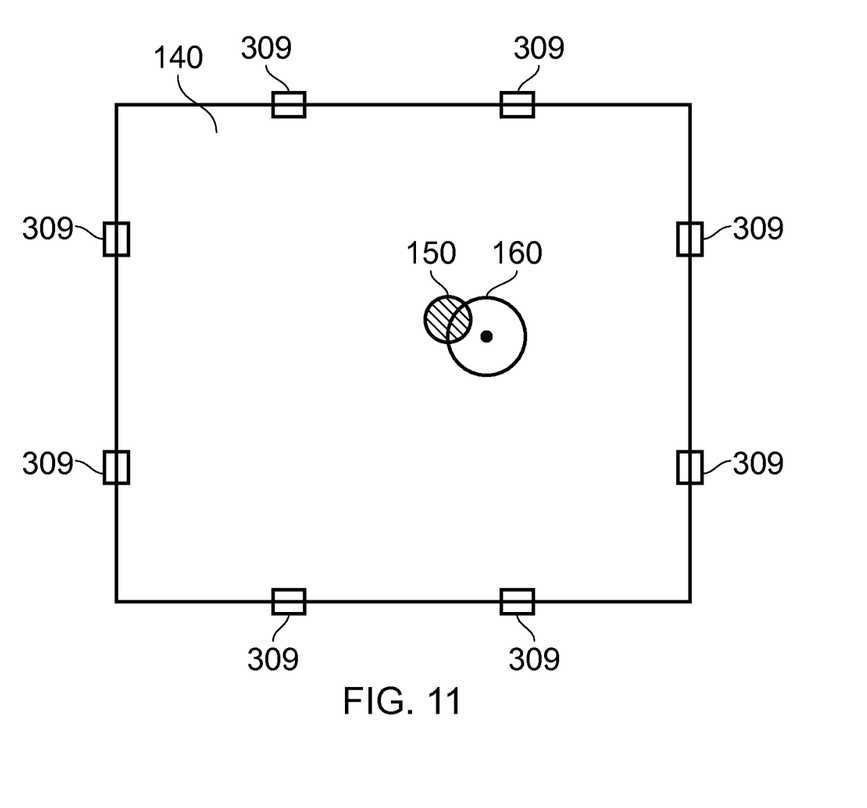
FIG. 11 illustrates a plurality of audio output devices for directed audio output.

As illustrated in FIG. 11, a plurality of audio output devices 309 may be arranged in the monitored scene space 140. The output devices 309 are controlled by the system 100 to created a specific audio field in the monitored scene space 140 such that audio output appears to the user 150 to come from the hot spot 160.

The system 100 may track the position of the user 150 relative to the hot spot and then create the required audio field using the plurality of audio output devices 309.

The feedback described above may be provided by such directional audio output. This directional audio output appears to originate from within a portion of the monitored scene space corresponding to the computer-implemented virtual boundary in the monitoring space (the hot-spot 160), irrespective of a bearing of the user 150 from the portion of the monitored scene space (hot-spot 160).

Referring back to FIG. 10, it will be understood that in some examples the blocks 304, 306 are only accessible only via the block 302. Thus browsing of the plurality of options is enabled only when the transition hand gesture is relative to the computer-implemented virtual boundary (e.g. at or near the hot spot 160). Browsing of the plurality of options is not enabled when the transition hand gesture is not relative to the computer-implemented virtual boundary (e.g. at or near the hot spot 160).

An extra condition or conditions may be placed on the transition from block 302 to block 304. For example, block 302 may enable browsing of the plurality of options only when the transition hand gesture is by a predetermined person and relative to the computer-implemented virtual boundary (e.g. at or near the hot spot 160). Browsing of the plurality of options is not enabled when the transition hand gesture is not relative to the computer-implemented virtual boundary (e.g. at or near the hot spot 160). Browsing of the plurality of options is not enabled when the transition hand gesture is not by the correct person.

A hot-spot 160 may be created, deleted or modified by a user. For example, a hot spot 160 may be created at a user's location by performing the transition two-handed gesture $148_A$.

For example, a hot spot 160 may be deleted by performing the transition two-handed gesture $148_A$ at the hot spot 160 and then performing a throw-away gesture with both hands. For example, a hot spot 160 may be moved by performing a two-handed pull (both hands in first state and moving either relative to the user or stationary relative to moving user 150) or a two-handed push (both hands in second state and moving either relative to the user or stationary relative to the moving user).

The system 100 allows a user 150 to perform remote control by performing predetermined gestures $148_A$, $148_B$, $148_C$ at or near the hot spot 160 corresponding to the computer-implemented virtual boundary 144. The system 100 may be configured to enable a user 150 to program one or more of the predetermined gestures $148_A$, $148_B$, $148_C$ by performing gestures in the monitored scene space 140.

Although audio feedback has been described above, the system 100 may, for example, provide audio and/or haptic feedback that is projected in the monitored scene space 140 or via a user's mobile device.

State Machine

It will be understood from the foregoing that two-handed gestures 148 may be used to transition between states in a state machine, and that the outcome following a particular two-handed gesture depends not only on the particular two-handed gesture 148 but also the current state of the state-machine and also the design of the state-machine which determines the post-transition state.

Feedback

The system 100 may provide feedback to a user to confirm that the system 100 has recognized a gesture 146. The feedback may comprise any suitable feedback, for example audio and/or visual and/or tactile feedback and so on. Additionally or alternatively the system 100 may send one or more messages to a device or devices to inform the user that the system 100 has implemented the virtual boundary 144.

Where a structural feature has been described, it may be replaced by means for performing one or more of the functions of the structural feature whether that function or those functions are explicitly or implicitly described.

Examples of the disclosure provide for an easy and intuitive way to define virtual boundaries for a surveillance system.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
    causing computer implementation of a virtual boundary in a monitoring space corresponding to a monitored scene space;
    processing sensor data to recognize a first hand gesture, relating to a first hand of a user in the monitored scene space, relative to the computer-implemented virtual boundary in the monitoring space and in response to recognizing the first hand gesture relative to the computer-implemented virtual boundary causing browsing of a plurality of options; and
    processing sensor data to recognize a second hand gesture, relating to a second hand of the user in the monitored scene space, relative to the virtual boundary in the monitoring space and in response to recognizing the second hand gesture in the monitored scene space selecting one of the plurality of options,
    wherein feedback of the plurality of options is provided to the user via audio output, wherein the audio output is directional and appears to originate from within a portion of the monitored scene space corresponding to the computer-implemented virtual boundary.

2. The method according to claim 1, further comprising recognizing the first hand gesture as part of a first two-handed gesture and recognizing the second hand gesture as part of a second two-handed gesture.

3. The method according to claim 1, further comprising recognizing the first hand gesture as a first two-handed gesture involving the first hand and the second hand of a user, wherein the first two-handed gesture comprises a moving first hand in a first state and a stationary second hand in a second state and comprising recognizing the second hand gesture as a second two-handed gesture involving the first hand and the second hand of a user, wherein the second two-handed gesture comprises a stationary first hand in the first state and a moving second hand in the second state.

4. The method according to claim 3, wherein one of the first and second state comprises a first and the other of the first and second state comprises palm open.

5. The method according to claim 1, wherein the plurality of options comprises command options enabling a user to make user commands.

6. The method according to claim 1, wherein the plurality of options is arranged as a list of options, wherein the first hand gesture changes a current option from one option in the list to another different option in the list, and wherein the second hand gesture selects the current option and provides a command in relation the current option.

7. The method according to claim 1, wherein the plurality of options is arranged as a list of options, wherein the first hand gesture in a first direction scrolls up the list changing a current option and wherein the first hand gesture in a second direction, opposite the first direction, scrolls down the list changing the current option, and wherein the second hand gesture selects the current option and provides a command in relation to the current option.

8. The method according to claim 1, further comprising providing feedback to the user in response to recognizing the first hand gesture relative to the computer-implemented virtual boundary indicating a currently browsed one of the plurality of options or in response to recognizing the second hand gesture indicating a consequence of selection of a current one of the plurality of options.

9. The method according to claim 1, further comprising, prior to processing sensor data to recognize the first hand gesture relative to the computer-implemented virtual boundary:
    processing sensor data to recognize a transition hand gesture relative to the computer-implemented virtual boundary in the monitoring space and in response to recognizing the transition hand gesture relative to the computer-implemented virtual boundary enabling browsing of the plurality of options.

10. The method according to claim 9, further comprising: enabling browsing of the plurality of options only when the transition hand gesture is relative to the computer-implemented virtual boundary, and not enabling browsing of the plurality of options when the transition hand gesture is not relative to the computer-implemented virtual boundary.

11. The method according to claim 9, further comprising: enabling browsing of the plurality of options only when the transition hand gesture is by a predetermined person and relative to the computer-implemented virtual boundary, and not enabling browsing of the plurality of options when the transition hand gesture is not relative to the computer-implemented virtual boundary and not enabling browsing of the plurality of options when the transition hand gesture is not by the predetermined person relative to the computer-implemented virtual boundary.

12. The method according to claim 1, wherein the options are options for controlling one or more appliances.

13. The method according to claim 1, further comprising:
providing an audio output to a user to enable the user to browse the plurality of options and selecting a user chosen one of the plurality of options,
wherein the audio output is a directional audio output configured to originate from within a portion of the monitored scene space corresponding to the computer-implemented virtual boundary in the monitoring space, irrespective of a bearing of the user from the portion of the monitored scene space.

14. An apparatus comprising means for performing the method of claim 1.

15. Computer program code embodied on a non-transitory computer-readable medium, that when performed by at least one processor, causes the processor to perform a method, comprising:
causing computer implementation of a virtual boundary in a monitoring space corresponding to a monitored scene space;
processing sensor data to recognize a first hand gesture, relating to a first hand of a user in the monitored scene space, relative to the computer-implemented virtual boundary in the monitoring space and in response to recognizing the first hand gesture relative to the computer-implemented virtual boundary causing browsing of a plurality of options; and
processing sensor data to recognize a second hand gesture, relating to a second hand of the user in the monitored scene space, relative to the virtual boundary in the monitoring space and in response to recognizing the second hand gesture in the monitored scene space selecting one of the plurality of options,
wherein feedback of the plurality of options is provided to the user via audio output, wherein the audio output is directional and appears to originate from within a portion of the monitored scene space corresponding to the computer-implemented virtual boundary.

16. An apparatus, comprising:
at least one processor; and
at least one memory including computer program code;
the at least one memory and the computer program code being configured to, with the at least one processor, cause the apparatus at least to perform:
causing computer implementation of a virtual boundary in a monitoring space corresponding to a monitored scene space;
processing sensor data to recognize a first hand gesture, relating to a first hand of a user in the monitored scene space, relative to the computer-implemented virtual boundary in the monitoring space and in response to recognizing the first hand gesture relative to the computer-implemented virtual boundary causing browsing of a plurality of options; and
processing sensor data to recognize a second hand gesture, relating to a second hand of the user in the monitored scene space, relative to the virtual boundary in the monitoring space and in response to recognizing the second hand gesture in the monitored scene space selecting one of the plurality of options,
wherein feedback of the plurality of options is provided to the user via audio output, wherein the audio output is directional and appears to originate from within a portion of the monitored scene space corresponding to the computer-implemented virtual boundary.

17. An apparatus, comprising:
computer circuitry configured to cause computer implementation of a virtual boundary in a monitoring space corresponding to a monitored scene space;
processing circuitry configured to process sensor data to recognize a first hand gesture, relating to a first hand of a user in the monitored scene space, relative to the computer-implemented virtual boundary in the monitoring space and in response to recognizing the first hand gesture relative to the computer-implemented virtual boundary causing browsing of a plurality of options, and
processing circuitry configured to process sensor data to recognize a second hand gesture, relating to a second hand of the user in the monitored scene space, relative to the virtual boundary in the monitoring space and in response to recognizing the second hand gesture in the monitored scene space selecting one of the plurality of options,
wherein feedback of the plurality of options is provided to the user via audio output, wherein the audio output is directional and appears to originate from within a portion of the monitored scene space corresponding to the computer-implemented virtual boundary.

* * * * *